(12) United States Patent (10) Patent No.: US 9,198,450 B2
Ewald et al. (45) Date of Patent: Dec. 1, 2015

(54) TABLE TOP BUN STEAMER AND METHOD

(75) Inventors: Henry T. Ewald, Roselle, IL (US); Paul G. Simmons, Glen Ellyn, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 629 days.

(21) Appl. No.: 12/798,809

(22) Filed: Apr. 12, 2010

(65) Prior Publication Data

US 2011/0250336 A1 Oct. 13, 2011

(51) Int. Cl.
*A47J 27/04* (2006.01)
*A23L 1/00* (2006.01)
*A23L 1/01* (2006.01)

(52) U.S. Cl.
CPC .............. *A23L 1/0121* (2013.01); *A47J 27/04* (2013.01)

(58) Field of Classification Search
CPC .............................. A47J 27/04; A23L 1/0121
USPC ...................................... 99/467, 473; 426/511
See application file for complete search history.

(56) References Cited

U.S. PATENT DOCUMENTS

| | | | |
|---|---|---|---|
| 2,253,154 A | 8/1941 | Tuttle | |
| 2,314,872 A * | 3/1943 | Dickey | 99/340 |
| 2,827,541 A | 4/1955 | Baldwin | |
| 3,555,993 A | 1/1971 | Garcia | |
| 3,682,664 A | 8/1972 | Bennett | |
| 3,735,749 A | 5/1973 | Binks et al. | |
| 3,889,582 A | 6/1975 | Binks et al. | |
| 4,281,636 A | 8/1981 | Vegh et al. | |
| 4,495,932 A | 1/1985 | Bratton | |
| 5,931,083 A | 8/1999 | Stanger et al. | |
| 6,516,709 B1 | 2/2003 | Lin | |
| 7,222,563 B2 | 5/2007 | Reckert et al. | |
| 7,810,488 B2 | 10/2010 | Manganiello et al. | |
| 2003/0024922 A1 | 2/2003 | Stanger et al. | |
| 2004/0166217 A1 * | 8/2004 | Reckert et al. | 426/511 |
| 2004/0208961 A1 | 10/2004 | Reckert et al. | |
| 2005/0183583 A1 * | 8/2005 | Baumann | 99/349 |
| 2010/0098825 A1 * | 4/2010 | Veltrop et al. | 426/505 |
| 2011/0162537 A1 * | 7/2011 | Chung et al. | 99/473 |

FOREIGN PATENT DOCUMENTS

WO 2004091346 A2 10/2004

OTHER PUBLICATIONS

International Searching Authority, International Search Report and Written Opinion, International Application No. PCT/US2011/000637, Jun. 9, 2011.
International Searching Authority, International Search Report and Written Opinion, International Application No. PCT/US2012/052058, Nov. 16, 2012.

* cited by examiner

*Primary Examiner* — Jianying Atkisson
(74) *Attorney, Agent, or Firm* — Hinshaw & Culbertson LLP (57) ABSTRACT

A cooking device is provided for steaming food items and transferring steamed food items from the device to a work surface. The device includes a platform for placing food items thereon mounted to a support for movement to and from food steaming and food removal positions. The food items can be transferred from the device without being individually handled by an operator. A method of steaming food items is provided using the cooking device. The food items do not need to be individually handled after they are steamed. A method of transferring steamed food items from the cooking device to a container or a work surface is also provided. The steamed food items are transferred without individual handling.

16 Claims, 7 Drawing Sheets

TABLE TOP BUN STEAMER AND METHOD

FIELD OF THE INVENTION

The present invention relates to food steaming devices and methods of steaming food in and removing food from food steaming devices. More particularly, the present invention relates to food steaming devices and methods for transferring food items from the food steaming devices to a work surface.

BACKGROUND OF THE INVENTION

When steaming a food item in a food steaming device, it is often desirable to transfer the steamed food item quickly to a container on a work surface, to further prepare the food item for serving. Existing food steamers typically include a food-supporting tray that is separate from and freely slidable into and out of a steam injector that comprises a cabinet assembly. At the end of a steaming cycle, the tray is slid out of the cabinet assembly and steamed food items are typically transferred by hand from the hot tray to an appropriate container, resulting in additional manual handling of the food item. Manual handling potentially may adversely affect the appearance of the steamed food item.

A need therefore exists for a food steaming device adapted for quick, touch-free removal of steamed food items from the device. Preferably, the device should be adapted for touch-free transfer of steamed food items from the device to a container on a work surface.

BRIEF SUMMARY OF THE INVENTION

In accordance with one aspect of the invention, a device for steaming a food item is provided. The device for steaming a food item comprises a food item platform, a platform support, a platform hinge connecting the food item platform to the platform support, wherein the food item platform is pivotable between a food steaming position and a food removal position, and a steam source communicating with a steam outlet, the steam outlet configured to direct steam onto the food item platform when the food item platform is in the food steaming position.

In another aspect of the invention, the food item platform is generally horizontal when in the food steaming position. The food item platform may be pivotable at least 180 degrees from the food steaming position. In one embodiment, the food steaming position is approximately 135 degrees offset from the food removal position.

The food item platform may comprise a steaming dome that directs steam through the food item platform and onto the food item. Typically, the steaming dome is sized to direct steam substantially uniformly onto a bun piece.

In another aspect of the invention, the food item platform comprises a first opening and a second opening, the first opening and the second opening configured so that an open clamshell container may be placed over the first opening and the second opening.

In one embodiment, the platform support comprises a plurality of platform mounts to allow the device to be mounted alternatively adjacent to a tabletop, mounted to the tabletop, and placed on the tabletop.

In one embodiment, the device includes a cover, wherein the cover cooperatively engages the food item platform defining a cavity, the cavity comprising a seal to substantially retain steam in the cavity when the device is in the food steaming position. The cover may comprise a cover hinge connecting the cover to the platform support opposite the platform hinge. Alternatively, the cover hinge may connect the cover to the platform support on the same side as the platform hinge. The cover hinge may be adjacent to and generally parallel to the platform hinge.

In another embodiment, the cover comprises two partitions which divide the cover into a left portion and a right portion, and wherein the left portion and the right portion are approximately the same size. The two partitions can be used to locate an open container on the cover.

In another embodiment, the food item platform comprises a food steaming panel comprising a steam permeable material. The food steaming panel may comprise a steaming dome that directs steam through the food item platform and onto the food item.

In accordance with another embodiment, the device includes an indicator. The indicator may be an LED indicator light. Alternatively, the indicator may be an audible signal indicator. The device may also include both an LED indicator light and an audible signal indicator.

In another aspect of the invention, a method of producing a steamed food item is provided. The method includes providing a device for steaming food that comprises a food item platform; a platform support; a platform hinge connecting the food item platform to the platform support, wherein the food item platform is pivotable between a food steaming position and a food removal position; and a steam source communicating with a steam outlet, the steam outlet configured to direct steam onto the food item platform when the food item platform is in the food steaming position. The food item platform is placed in the food steaming position. A food item is placed on the food item platform. Steam is directed from the steam source through the steam outlet and onto the food item for a period of time sufficient to at least substantially steam the food item. A food container which may be a clamshell paperboard container, for example, is placed over the food item. The food item platform is rotated from the food steaming position to the food removal position to transfer the food item from the food item platform to the container.

In one aspect of the method, the food removal position is offset approximately 135 degrees from the food steaming position.

In another embodiment, the period of time sufficient to at least substantially steam the food item is approximately 12 seconds.

The method may further comprise signaling that the steaming of the food item is at least substantially completed.

In a further embodiment, a cover movable between an open position and a closed position is provided. The cover is moved to the open position to permit placing a food item on the food item platform. The cover is then moved to the closed position to define a cavity, the cavity comprising the food item and configured to at least substantially retain steam. After steam is directed from the steam source, the cover is moved to the open position to permit moving the food item platform from the food steaming position to the food removal position.

In another embodiment of the invention, a method of producing a steamed food item is provided. This method includes providing a device comprising a food item platform; a platform support; a platform hinge connecting the food item platform to the platform support, wherein the food item platform is pivotable between a food steaming position and a food removal position; and a steam source communicating with a steam outlet, the steam outlet configured to direct steam onto the food item platform when the food item platform is in the food steaming position. A cover is provided. The cover includes two partitions which divide the cover into a left portion and a right portion, and a cover hinge connecting the cover to the platform support. The cover is movable between an open position and a closed position, and the cover hinge is adjacent to and approximately parallel to the platform hinge. The food item platform is placed in the food steaming position. The cover is opened and a food item is placed on the food item platform. The cover is subsequently closed and steam is directed from the steam source through the steam outlet and onto the food item for a period of time sufficient to essentially steam the food item. The cover is then opened, and an open container is placed over the partitions on the cover. The food item platform is rotated from the food steaming position to the food removal position, transferring the food item from the food item platform to the container on the cover.

In another aspect of the invention, a method of transferring a steamed food item is provided. The method includes providing a device that includes a food item platform, a platform support, a platform hinge connecting the food item platform to the platform support, wherein the food item platform is pivotable between a food steaming position and a food removal position, and a steam source communicating with a steam outlet, the steam outlet configured to direct steam onto the food item platform when the food item platform is in the food steaming position. A steamed food item is provided on the food item platform in the food steaming position by steaming the food item. A container which may be a clamshell-type food container, for example, is placed over the food item. The food item is steamed and then the food item platform is rotated from the food steaming position to the food removal position to transfer the steamed food item from the food item platform to the container.

DETAILED DESCRIPTION OF THE INVENTION

Table top food item steamers, methods for using them to steam food items, and methods for transferring steamed food items are described in this section.

With reference to the Figures generally, a table top food steaming device 10 adapted for quick steaming, removal, and transfer of food items from device 10 to a work surface is described. In particular, steaming device 10 is shown in various orientations to illustrate its structure and function, as well as a method of using the device.

As illustrated in FIGS. 1-6, steaming device 10 includes a platform support 12 which supports a food item platform 14. Food item platform 14 is illustrated separately in detail in FIG. 7. Food item platform 14 typically is essentially rectangular in shape. A steam permeable panel 16 having steaming domes 18a and 18b is attached to food item platform 14. Steam permeable panel 16 is adapted to support food items to be steamed on steaming domes 18a and 18b. Steaming domes 18a and 18b are adapted to receive a food item placed thereon. Typically, steaming domes 18a and 18b are sized to direct steam substantially uniformly onto a food item such as a bun crown or heel.

Figure 8:
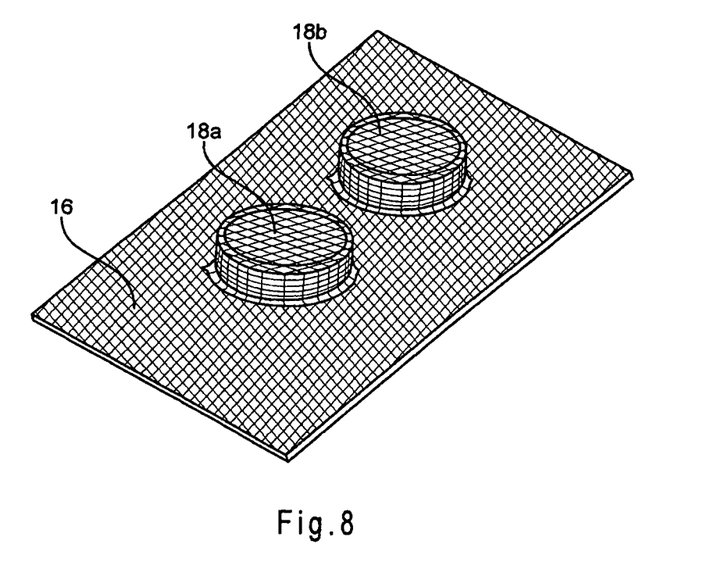
FIG. 8 is a perspective view of a steam permeable panel for a steaming device according to the present invention.

Steam permeable panel 16, shown separately in detail in FIG. 8, may be formed of any suitable steam permeable material preferably having a relatively low thermal conductivity and a relatively high temperature resistance, including but not limited to silicone, nylon or metal and may be in the form of a mesh or screen to allow steam to readily pass therethrough.

Steam permeable panel 16 may be attached to food item platform 14 in any suitable manner, including, but not limited to, the application of a thermally resistant adhesive or a mechanical fastener.

Food item platform 14 is connected to platform support 12 via a platform hinge 20. Platform hinge 20 includes at least one platform hinge attachment 22 mounted to a platform hinge bracket 24, attaching food item platform 14 to platform support 12. Platform hinge 20 allows food item platform 14 to be rotated about an essentially horizontal axis in the direction of arrow L by an operator using a platform handle 26. Typically, platform hinge 20 allows food item platform 14 to be rotated at least 180 degrees about an essentially horizontal axis.

Figures 1, 2, 2A:
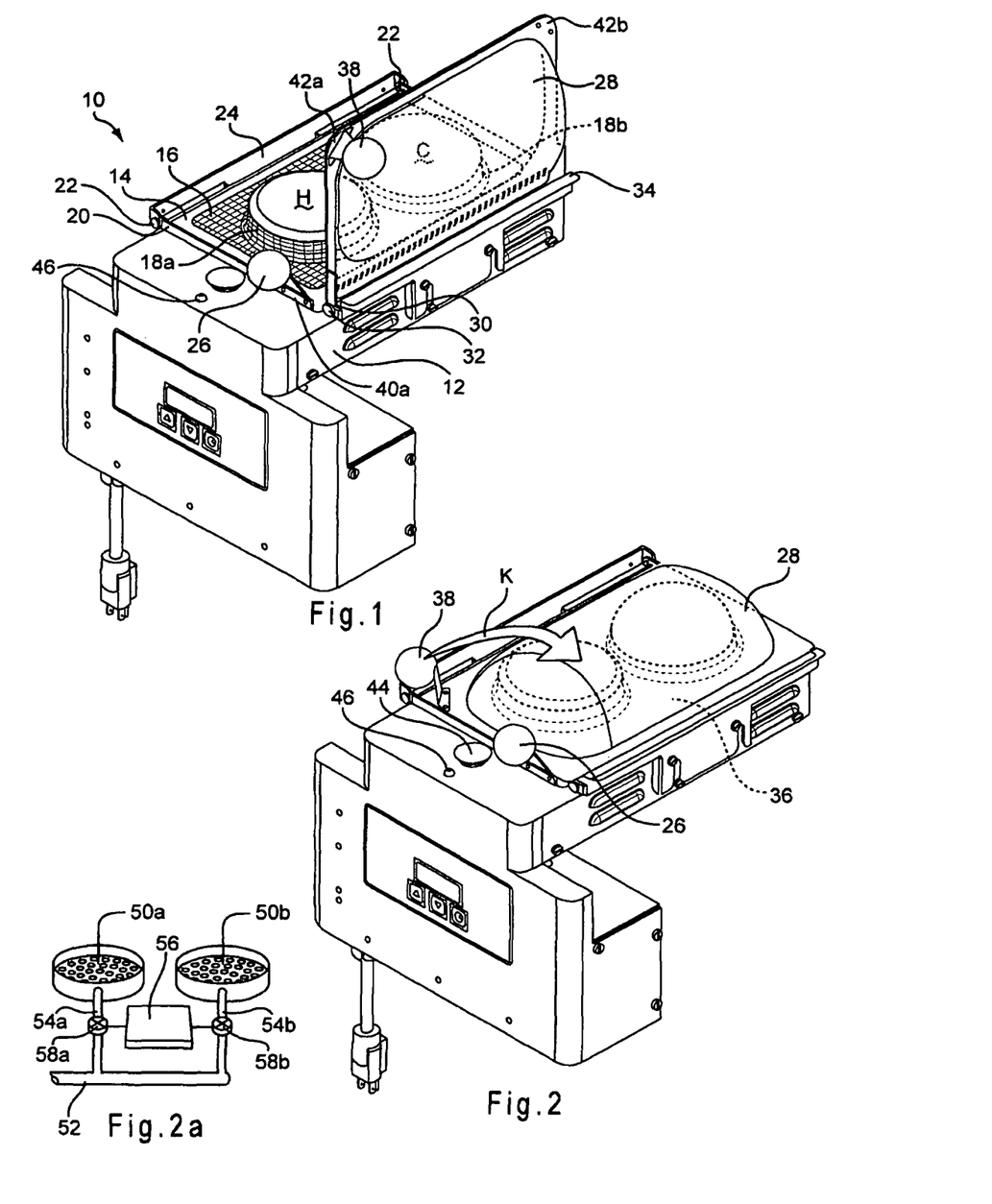
FIG. 1 is a perspective view of a steaming device according to one aspect of the present invention.
FIG. 2 is a perspective view of a steaming device according to another aspect of the present invention.
FIG. 2a is a schematic representation of a microprocessor controlled steam source according to the present invention.
Figure 4:
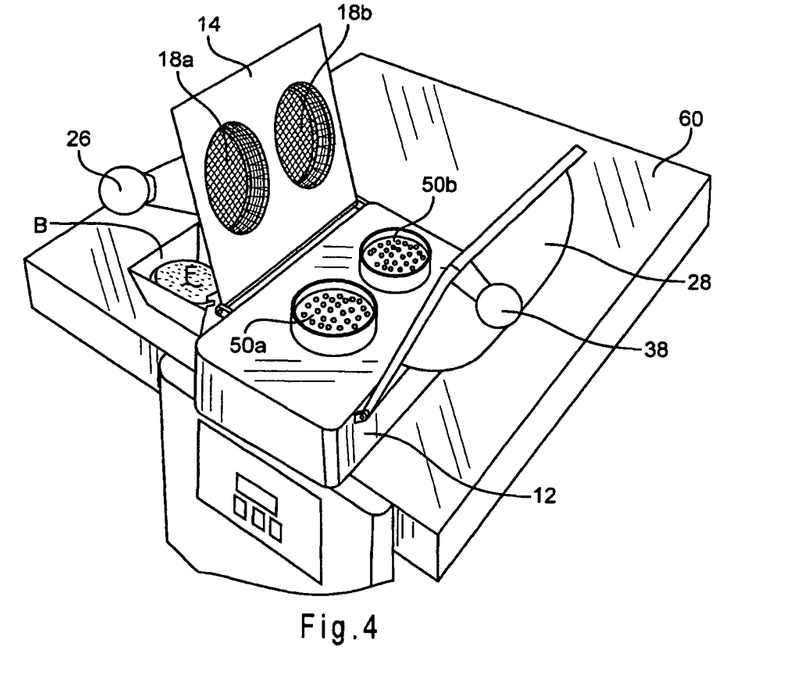
FIG. 4 is a perspective view of a steaming device according to another aspect of the present invention.

When food item platform 14 is substantially engaged with platform support 12 as illustrated in FIG. 1, food item platform 14 is in the food steaming position. Typically, food item platform 14 is generally horizontal when in the food steaming position. When food item platform 14 is rotated and disengaged from platform support 12 as illustrated in FIG. 4, food item platform 14 is in the food removal position. Typically, food item platform 14 can be rotated at least about 180 degrees between the food steaming position and the food removal position. Typically, the food removal position is approximately at least 135 degrees offset from the food steaming position.

Steaming device 10 further includes a cover 28. Cover 28 is shown separately in detail in FIG. 9. Cover 28 is connected to platform support 12 via a cover hinge 30. Cover hinge 30 includes at least one cover hinge attachment 32 mounted to a cover hinge bracket 34, and functions to attach cover 28 to platform support 12. When cover 28 is in the closed position, as illustrated in FIG. 2, it essentially covers food item platform 14 to form a cavity 36. Typically, cover 28 is essentially rectangular in shape and has approximately the same width and length as food item platform 14. Cover hinge 30 allows cover 28 to be opened, exposing food item platform 14. Cover hinge 30 allows the cover 28 to be rotated about an essentially horizontal axis by an operator using a cover handle 38. Cover hinge 30 allows cover 28 to be rotated at least 90 degrees about an essentially horizontal axis in the direction of arrow K. Typically, cover hinge 30 allows cover 28 to be rotated at least 135 degrees about an essentially horizontal axis, providing clearance to allow food item platform 14 to be rotated via platform hinge 20.

Cover hinge 30 typically attaches cover 28 to platform support 12 on a different side from where platform hinge 20 attaches food item platform 14 to platform support 12. Cover hinge 30 can attach cover 28 to platform support 12 in a manner to rotate in a different direction from food item platform 14. Typically, cover hinge 30 attaches cover 28 to platform support 12 in a manner to rotate in the opposite direction from food item platform 14. As illustrated in FIG. 1, food item platform 14 rotates in a counterclockwise direction, towards the left, and cover 28 rotates in a clockwise direction, towards the right.

Optionally, platform hinge attachments 22 and cover hinge attachments 32 are adapted to be selectively mounted to either platform hinge bracket 24 or cover hinge bracket 34, interchangeable between the hinge brackets. Preferably, platform hinge attachment 22 can be connected to either platform hinge bracket 24 or cover hinge bracket 34 and cover hinge attachment 32 can be mounted to either platform hinge bracket 24 or cover hinge bracket 34. Food item platform 14 is situated in either a leftward pivoting or rightward pivoting orientation, allowing food item platform 14 to be rotated in either the clockwise or counterclockwise direction depending on the preferred mode of operation, and accommodating both right-handed and left-handed human operators. Cover 28 is situated in either a leftward pivoting or rightward pivoting orientation, allowing cover 28 to be rotated in either the clockwise or counterclockwise direction depending on the preferred mode of operation.

Figure 6:
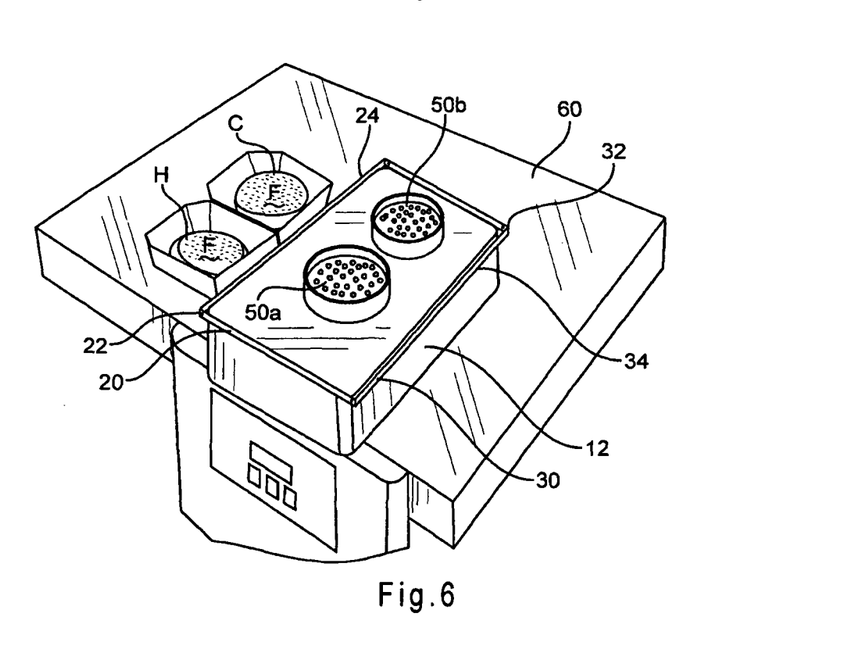
FIG. 6 is a perspective view of a platform support according to one aspect of the present invention.
Figure 7:
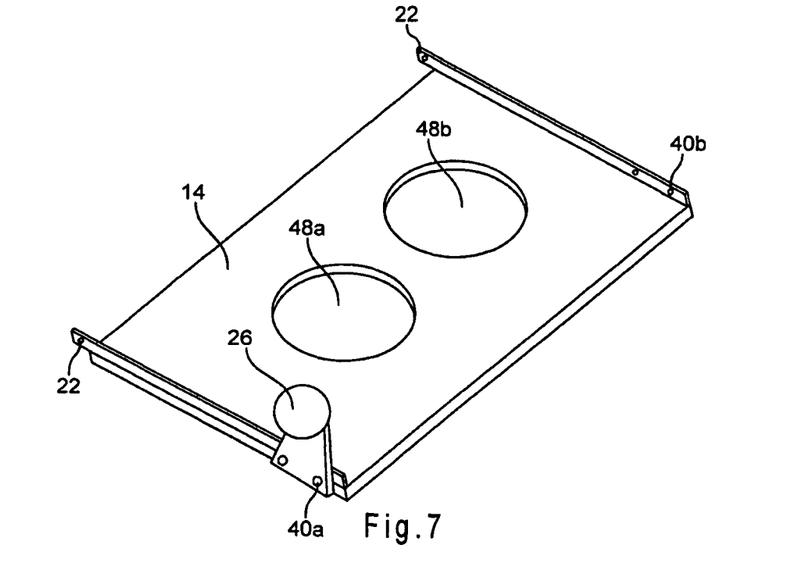
FIG. 7 is a perspective view of a food item platform for a steaming device according to the present invention.

Cover 28 includes alternate handle mounts 42a and 42b at adjacent corners to allow cover handle 38 to be attached at the appropriate corner to be accessible from the front of steaming device 10 in its leftward pivoting or rightward pivoting orientations. As illustrated in FIG. 7, food item platform 14 further includes similar alternate handle mounts 40a and 40b at adjacent corners to allow platform handle 26 to be attached at the appropriate corner to be accessible from the front of steaming device 10 in its leftward pivoting or rightward pivoting orientations. FIG. 6 is an illustration of platform support 12 with food item platform 14 and cover 28 detached therefrom, ready for each of food item platform 14 and cover 28 to be mounted to either hinge bracket 24 or hinge bracket 34 as desired.

Steaming device 10 also includes a button 44 for activating steaming device 10. Steaming device 10 also includes an LED indicator 46 which indicates when the steaming process is complete. The steaming device may also include any other type of suitable indicator that steaming is complete, including, but not limited to, an audible signal.

FIG. 2 illustrates steaming device 10 in the closed position. Cover 28 is pivotally rotated to engage with platform support 12, forming cavity 36. Preferably, cover 28 cooperatively engages with platform support 12 to form steaming cavity 36 when steaming device 10 is in the closed position, to at least substantially retain steam inside cavity 36 during steaming. Steaming is initiated by an operator by activating button 44 or triggering any other appropriate actuator. A controlled quantity of steam is injected through steam permeable panel 16 once steaming is initiated. Typically, a food item is located on steaming domes 18a and 18b and is steamed from the controlled quantity of steam. The food item can be any food item that is to be steamed. Typically the food item is a bun piece, such as a heel H or a crown C.

As illustrated in FIG. 7, to permit passage of steam from a steam source into heel H and crown C, food item platform 14 includes platform openings 48a and 48b, which communicate with steaming domes 18a and 18b, respectively. Platform support 12 includes steam outlets 50a and 50b, as illustrated in FIG. 4, which communicate with steaming domes 18a and 18b, respectively.

Any suitable steam source may be configured in communication with steam outlets 50a and 50b to provide controlled quantities of steam for injection into food items in steaming device 10. Each steam outlet may have its own steam source or may share a common steam source. Referencing schematic FIG. 2a, a common steam source 52 supplies steam to both steam outlets 50a and 50b, via respective heated sinks 54a and 54b. A microprocessor control system 56 is provided for directing solenoids 58a and 58b to provide a water pulse to one of associated heated sinks 54a and 54b about 0.1 second before providing a water pulse to the other heated sink. Such staggering of water pulses has been found to promote more uniform water input to each heated sink than simultaneous water pulses and consequently, a more uniform quantity or shot of steam from heated sinks 54a and 54b.

Figure 3:
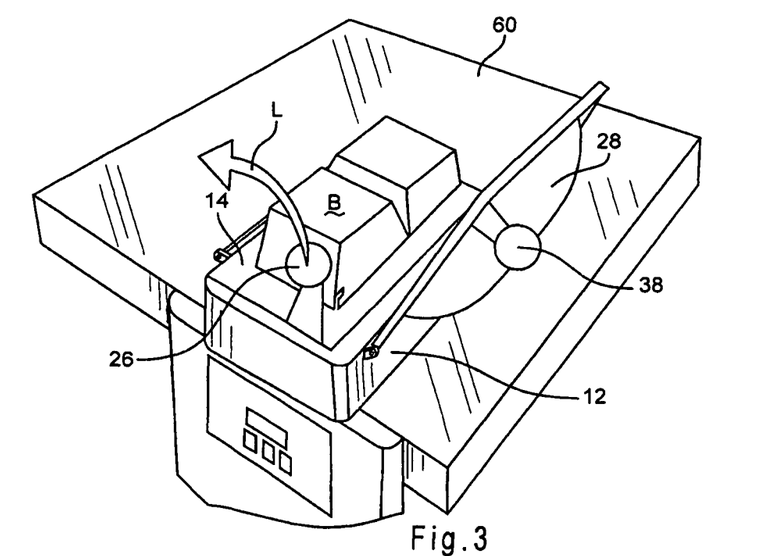
FIG. 3 is a perspective view of a steaming device according to another aspect of the present invention.

As illustrated in FIG. 3, steaming device 10 includes platform support 12, food item platform 14, and cover 28. Cover 28 is in an open position, and clamshell box B is in place over the steamed food item to be transferred to a work surface 60 together with the steamed food item. Any appropriate packaging may be placed over the steamed food item. Typically, the packaging is a clamshell box. Placing packaging over the steamed food item prior to transferring the food item to a work surface is advantageous when it is desired to prevent the food item from directly contacting the work surface or the hand of a human operator. The work surface can be any appropriate surface for holding or preparing the food item. Typically the work surface is an approximately horizontal surface or table.

As illustrated in FIG. 4, steaming device 10 includes platform support 12, food item platform 14, steaming domes 18a and 18b, steam outlets 50a and 50b, and cover 28. Cover 28 is in the open position. Food item platform 14 is shown in an open position. Clamshell box B is on work surface 60, transferred to work surface 60 from the rotational momentum to the steamed food items and clamshell box B during rotation of food item platform 14 from the food steaming position to the food removal position. Clamshell box B contains bun heel H and crown C with cut faces F facing upward as illustrated in FIGS. 4-5 to facilitate placement of sandwich ingredients on cut faces F.

Figure 5:
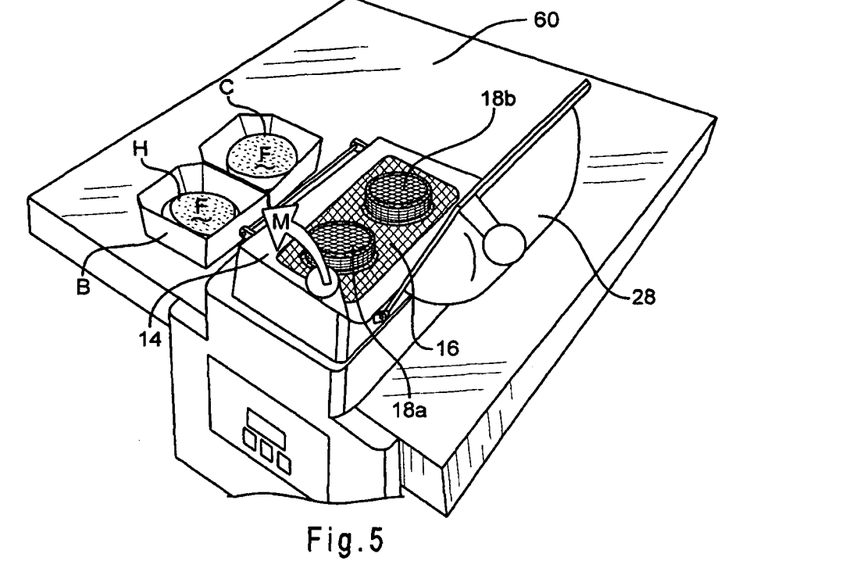
FIG. 5 is a perspective view of a steaming device according to another aspect of the present invention.

FIG. 5 illustrates steaming device 10 in the food steaming position, after steamed buns have been transferred to work surface 60. Steaming device 10 can now receive another food item to be steamed. Food item platform 14 can be rotated about an essentially horizontal axis in the direction of arrow M by an operator using a platform handle 26.

FIG. 6 illustrates platform support 12. Platform support 12 includes platform hinge 20 and cover hinge 30. Platform hinge 20 includes platform hinge attachment 22 and platform hinge bracket 24. Cover hinge 30 includes cover hinge attachment 32 and cover hinge bracket 34. Platform support 12 is ready for each of food item platform 14 and cover 28 to be mounted to either hinge 20 or 30, as desired.

FIG. 7 illustrates food item platform 14. Food item platform 14 includes platform openings 48a and 48b, which are slightly larger than steaming domes 18a and 18b as illustrated in FIG. 5. Platform hinge attachments 22 are adapted to connect food item platform 14 to a platform support of a steaming device. Food item platform 14 also includes platform handle 26. Platform handle 26 is attached to food item platform 14 via handle mount 40a. Alternatively, platform handle 26 can be attached to food item platform 14 via handle mount 40b.

FIG. 8 illustrates steam permeable panel 16. Steam permeable panel 16 includes steaming domes 18a and 18b. Steaming domes 18a and 18b are of the appropriate size and shape to accept placement of a food item thereon. Typically, steaming domes 18a and 18b are slightly larger than a hamburger bun and accept placement of a hamburger bun thereon.

Figure 9:
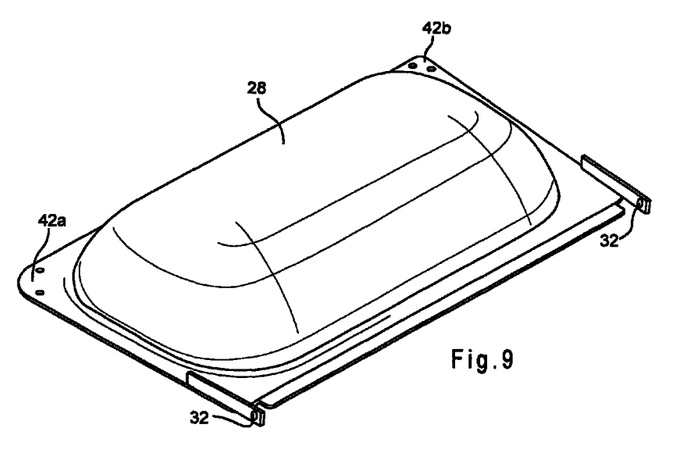
FIG. 9 is a perspective view of a steam enclosure cover for a steaming device according to the present invention.

FIG. 9 illustrates cover 28. Cover 28 is dome shaped to form a cavity when cover 28 is in the closed position and engaged with a food item platform. Cover 28 is typically a curved dome. The curved dome prevents water from falling from the cover back onto the steamed food item. This improves the quality of the food item and prevents the food item from getting soggy. This is especially important for a bun or other bread product which could easily become soggy and of a decreased quality if water were permitted to drip thereon. Cover 28 further includes cover hinge attachments 32 to allow cover 28 to be attached to a platform support on a steaming device. Cover 28 includes alternate handle mounts 42a and 42b at adjacent corners to allow a cover handle to be attached, at the appropriate corner to be accessible from the front of a steaming device in its leftward pivoting or rightward pivoting orientations.

Figure 10:
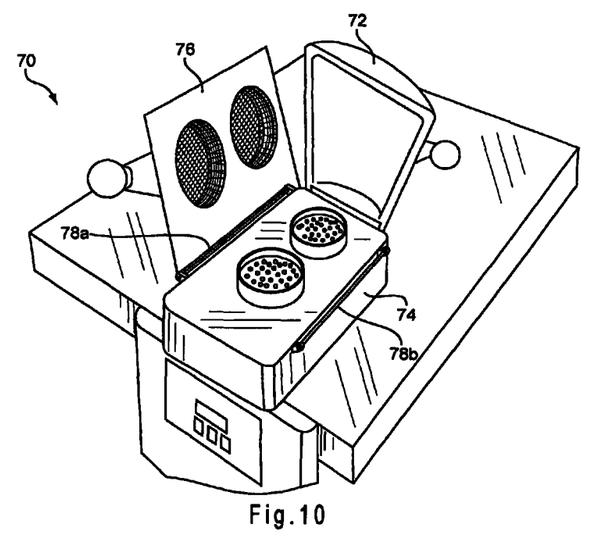
FIG. 10 is a perspective view of a steaming device according to another aspect of the present invention.

In another embodiment, as illustrated in FIG. 10, food steaming device 70 is provided. Food steaming device 70 includes a cover 72 configured to pivot rearwardly away from a platform support 74, at an approximate right angle to the pivoting direction of a food item platform 76. Platform support 74 is approximately rectangular shaped and includes a width and a length. Cover 72 is attached to platform support 74 along the width portion of platform support 74. Food item platform 76 is attached to platform support 74 along the length portion of platform support 74. Food item platform 76 may be freely mounted to either of two hinge brackets 78a and 78b, for leftward pivoting as shown or for rightward pivoting, without the need to switch the mounting position of cover 72.

Figure 11:
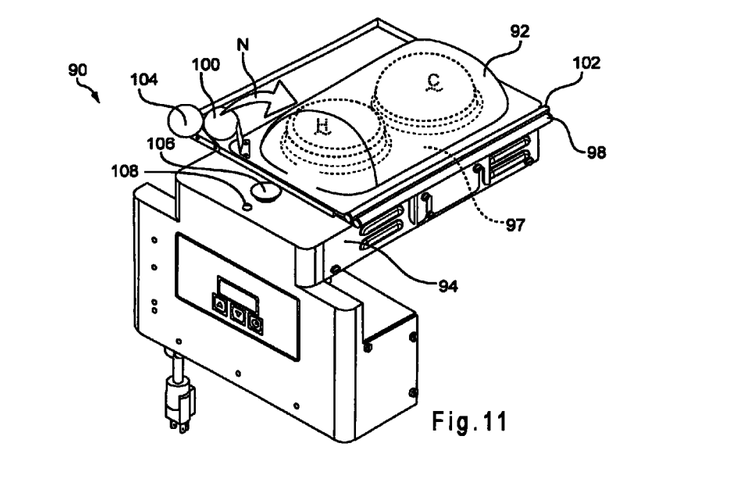
FIG. 11 is a perspective view of a steaming device according to another aspect of the present invention.

In another embodiment, as illustrated in FIGS. 11-14, food steaming device 90 is provided. Food steaming device 90 includes a cover 92 configured to pivot away from a platform support 94 in the direction of arrow N. Food item platform 96 is configured to pivot open in the direction of arrow O. Cover 92 pivots open in the same direction as food item platform 96. When cover 92 is in the closed position, as illustrated in FIG. 11, it essentially covers food item platform 96 to form a cavity 97. Platform support 94 is approximately rectangular shaped and includes a width and a length. Cover 92 is attached to platform support 94 along the length portion of platform support 94 via a cover hinge 98. Cover hinge 98 allows cover 92 to be rotated about an essentially horizontal axis by an operator using cover handle 100. Typically, cover hinge 98 allows cover 92 to be rotated at least 180 degrees about an essentially horizontal axis. Food item platform 96 is attached to platform support 94 along the length portion of platform support 94 via a platform hinge 102. Platform hinge 102 allows food item platform 96 to be rotated about an essentially horizontal axis by an operator using platform handle 104. Typically, platform hinge 102 allows food item platform 96 to be rotated at least 180 degrees about an essentially horizontal axis. Cover hinge 98 is adjacent to and generally parallel to platform hinge 102.

Steaming device 90 also includes a button 106 for activating steaming device 90. Steaming device 90 also includes an LED indicator 108 which indicates when the steaming process is complete. The steaming device may also include any other type of suitable indicator that steaming is complete, including, but not limited to, an audible signal.

Figure 12:
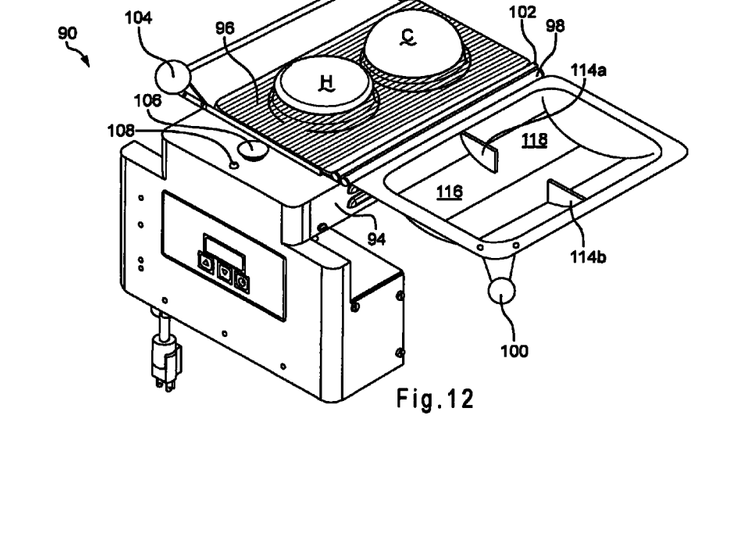
FIG. 12 is a perspective view of a steaming device according to another aspect of the present invention.
Figure 13:
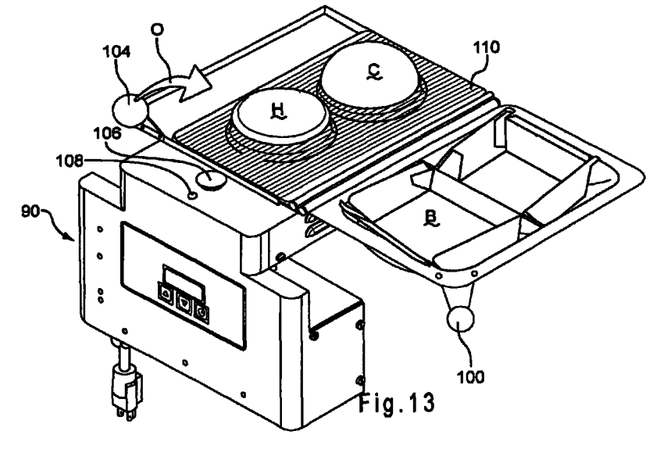
FIG. 13 is a perspective view of a steaming device according to another aspect of the present invention.
Figure 14:
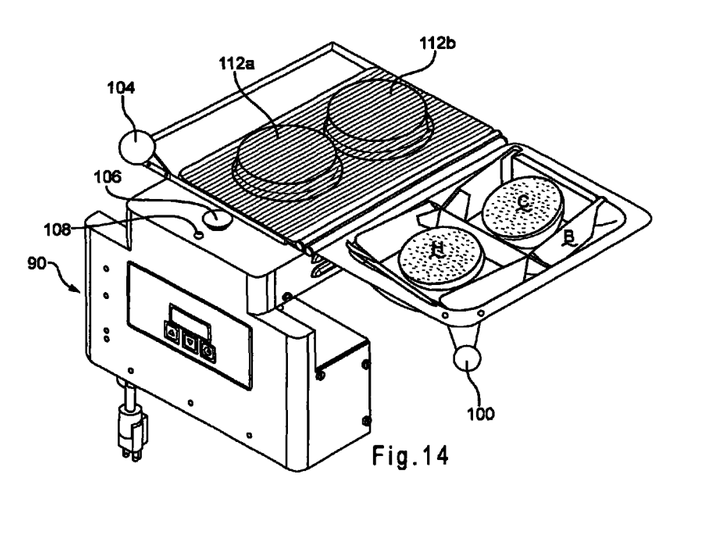
FIG. 14 is a perspective view of a steaming device according to another aspect of the present invention.

Cover 92 is in the open position as illustrated in FIGS. 12-14. A steam permeable panel 110 having steaming domes 112a and 112b is attached to food item platform 96. Steam permeable panel 110 is adapted to support food items to be steamed on steaming domes 112a and 112b. Steaming domes 112a and 112b are adapted to receive a food item placed thereon. Typically, steaming domes 112a and 112b are sized to direct steam substantially uniformly onto a food item such as a bun crown C or heel H.

Cover 92 also includes partitions 114a and 114b. Partitions 114a and 114b are located approximately in the middle of the length of cover 92, and extend across a portion of the width of cover 92. Partitions 114a and 114b are approximately linearly arranged, and are configured to allow for the location of a container on cover 92. Partitions 114a and 114b divide cover 92 into a left portion 116 and a right portion 118. Left portion 116 is approximately the same size as right portion 118. As illustrated in FIGS. 13-14, open clamshell container B is configured over partitions 114a and 114b with a bottom portion of clamshell container B on one side of partitions 114a and 114b and a top portion of clamshell container B on the other side of partitions 114a and 114b. The bottom and top portions of clamshell box B are configured to accept a food item from steaming domes 112a and 112b, such as bun crown C and heel H, as illustrated in FIG. 14.

In an additional embodiment of the present invention, it is possible to place multiple steaming devices end to end, linearly arranged on a workspace. Such an arrangement would allow for multiple steaming devices to be contained within one housing. Each steaming device would contain its own set of controls, which could operate each of the steaming devices individually or together as a unit. Typically, two steaming devices would be placed end to end, linearly arranged on a workspace such as a counter, and contained within one housing. A user could access the steaming devices from either side of the workspace, allowing for operation of the steaming devices from either side of the workspace.

In another embodiment of the present invention, a method of producing a steamed food item is provided. A food steaming device is provided. The food steaming device includes a food item platform; a platform support; a platform hinge connecting the food item platform to the platform support, wherein the food item platform is pivotable between a food steaming position and a food removal position; and a steam source communicating with a steam outlet, the steam outlet configured to direct steam onto the food item platform when the food item platform is in the food steaming position.

The food item platform is placed in the food steaming position. When in the food steaming position, the food item platform is substantially engaged with a platform support. An example of a food item platform in the food steaming position is illustrated in FIG. 1. Typically, the food item platform is generally horizontal when in the food steaming position.

A food item desired to be steamed is placed on the food item platform. Any appropriate food item can be steamed. Typically, hamburger buns are steamed and placed on the food item platform.

Steam is directed through the steam outlet and onto the food item for a period of time sufficient to essentially steam the food item. The time period sufficient to essentially steam the food item depends on the food item. For a typical hamburger bun or bread product, the period of time sufficient to essentially steam the bun or bread product is approximately 12 seconds. Any suitable steam source may be configured in communication with the steam outlets to provide controlled quantities of steam for injection into food items. For multiple steam outlets, each steam outlet may have its own steam source or may share a common steam source. Referencing schematic FIG. 2a, a common steam source 52 supplies steam to both steam outlets 50a and 50b, via respective heated sinks 54a and 54b. Steam outlets 50a and 50b are approximately circular in shape. Steam outlets may be any appropriate shape, such as oval or circular. Typically, the steam outlets are circular. A microprocessor control system 56 is provided for directing solenoids 58a and 58b to provide a water pulse to one of associated heated sinks 54a and 54b about 0.1 second before providing a water pulse to the other heated sink. Such staggering of water pulses has been found to promote more uniform water input to each heated sink than simultaneous water pulses.

When the food item is substantially steamed, or steamed a desired amount, a container is placed over the food item. Any appropriate container may be used. Typically, a clamshell box is used as the container.

The food item platform is rotated from the food steaming position to the food removal position to transfer the food item from the food item platform to the container and to transfer the container to a work surface. The food removal position is typically offset at least approximately 135 degrees from the food steaming position. The food removal position may be offset approximately 180 degrees from the food steaming position. Rotation to the food removal position allows the transfer of the food item without individual handling of the steamed food item.

In a further embodiment of the invention, a signal is provided when the food item is essentially steamed. The signal can be any appropriate signal, including, but not limited to, an LED indicator. An audible signal can also be utilized, either in lieu of an LED indicator or in addition to an LED indicator.

In another embodiment, a cover is provided. The cover is movable between an open position and a closed position on the platform support. Typically the cover is moved to the open position to permit placing a food item on the food item platform. The cover is moved to the closed position, defining a cavity. The cavity typically comprises the food item and is configured to at least substantially retain steam. The cover engages with the platform support to provide a seal between the cover and the platform support, allowing the food to be steamed within the cavity. After steam is directed from the steam source through the food item, the cover is moved to the open position to permit moving the food item platform from the food steaming position to the food removal position.

In another embodiment of the invention, a method of producing a steamed food item is provided. A food steaming device is provided. The food steaming device includes a food item platform; a platform support; a platform hinge connecting the food item platform to the platform support, wherein the food item platform is pivotable between a food steaming position and a food removal position; and a steam source communicating with a steam outlet, the steam outlet configured to direct steam onto the food item platform when the food item platform is in the food steaming position.

A cover is provided. The cover includes two partitions which divide the cover into a left portion and a right portion, and a cover hinge connecting the cover to the platform support. The cover hinge is adjacent to and parallel to the platform hinge. The cover is movable between an open position and a closed position on the platform support. Typically the cover is moved to the open position to permit placing a food item on the food item platform.

The food item platform is placed in the food steaming position. When in the food steaming position, the food item platform is substantially engaged with the platform support.

An example of a food item platform in the food steaming position is illustrated in FIGS. 1 and 12. Typically, the food item platform is generally horizontal when in the food steaming position.

The cover is opened. The food item platform is still in the food steaming position and is substantially engaged with the platform support. An example of the open cover while the food item platform is in the food steaming position is illustrated in FIG. 12.

A food item desired to be steamed is placed on the food item platform. Any appropriate food item can be steamed. Typically, hamburger buns are steamed and placed on the food item platform.

After the food is placed on the food item platform, the cover is closed. When the cover is moved to the closed position, it defines a cavity. The cavity typically comprises the food item and is configured to at least substantially retain steam. The cover engages with the platform support to provide a seal between the cover and the platform support, allowing the food to be steamed within the cavity. After steam is directed from the steam source through the food item, the cover is moved to the open position to permit moving the food item platform from the food steaming position to the food removal position.

Steam is directed through the steam outlet and onto the food item for a period of time sufficient to essentially steam the food item. The time period sufficient to essentially steam the food item depends on the food item. For a typical hamburger bun or bread product, the period of time sufficient to essentially steam the bun or bread product is approximately 12 seconds. Any suitable steam source may be configured in communication with the steam outlets to provide controlled quantities of steam for injection into food items. For multiple steam outlets, each steam outlet may have its own steam source or may share a common steam source. Referencing schematic FIG. 2a, a common steam source 52 supplies steam to both steam outlets 50a and 50b, via respective heated sinks 54a and 54b. Steam outlets 50a and 50b are approximately circular in shape. Steam outlets may be any appropriate shape, such as oval or circular. Typically, the steam outlets are circular. A microprocessor control system 56 is provided for directing solenoids 58a and 58b to provide a water pulse to one of associated heated sinks 54a and 54b about 0.1 second before providing a water pulse to the other heated sink. Such staggering of water pulses has been found to promote more uniform water input to each heated sink than simultaneous water pulses.

When the food item is substantially steamed, or steamed a desired amount, the cover is opened. An open container is placed over the partitions on the cover. Any appropriate container may be used. Typically, a clamshell box is used as the container. The container is placed over the partitions and is oriented to catch the food item from the food item platform. An example of a container placed on the open cover is illustrated in FIG. 13.

The food item platform is rotated from the food steaming position to the food removal position to transfer the food item from the food item platform to the container. The food removal position is typically offset at least approximately 135 degrees from the food steaming position. The food removal position may be offset approximately 180 degrees from the food steaming position. Rotation to the food removal position allows the transfer of the food item without individual handling of the steamed food item. The food item is then transferred from the food item platform to the container on the cover.

In a further embodiment of the invention, a signal is provided when the food item is essentially steamed. The signal can be any appropriate signal, including, but not limited to, an LED indicator. An audible signal can also be utilized, either in lieu of an LED indicator or in addition to an LED indicator.

In another embodiment of the present invention, a method of transferring a steamed food item is provided. A food steaming device is provided. The food steaming device includes a food item platform; a platform support; a platform hinge connecting the food item platform to the platform support, wherein the food item platform is pivotable between a food steaming position and a food removal position; and a steam source communicating with a steam outlet, the steam outlet configured to direct steam onto the food item platform when the food item platform is in the food steaming position.

A steamed food item on the food item platform is provided. The food item platform is in the food steaming position. Typically, the food steaming position is approximately horizontal.

A container is placed over the food item. Any appropriate container may be used. Typically, a clamshell box is used as the container.

The food item platform is rotated from the food steaming position to the food removal position to transfer the food item from the food item platform to the container and to transfer the container to a work surface. The food removal position is typically offset at least approximately 135 degrees from the food steaming position. The food removal position may be offset approximately 180 degrees from the food steaming position. Rotation to the food removal position allows the transfer of the food item without individual handling of the steamed food item.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A device for steaming and dispensing a hamburger bun comprising:
    a bun platform including a pair of openings, each opening having approximately the size and shape of a cut face of a hamburger bun section to direct steam substantially uniformly onto the cut face;
    a platform support;
    a pivotal platform joint connecting the bun platform to the platform support, wherein the bun platform is pivotable at least about 135° in a bun dispensing direction about a pivotal axis defined by the joint between an upwardly facing food steaming position and downwardly facing food removal position; and
    a steam source communicating with a steam outlet, the steam outlet located below the bun platform and configured to direct steam upwardly through the pair of bun platform openings, and when hamburger bun sections are placed on the bun platform over the bun platform openings, to direct steam onto the cut surfaces of the hamburger bun sections when the bun platform is in the food steaming position, for steaming the bun sections on the bun platform;
    further comprising a dome shaped cover movable between open and closed positions, wherein the cover is configured to cooperatively engage the bun platform in the food steaming position when the cover is in the closed position to define a cavity, the cover sized and shaped to prevent water from falling from the cover back onto the hamburger bun sections during steaming with the device when the bun sections are on the bun platform over the bun platform openings and the cover engages the bun platform in the closed position.

2. The device of claim 1 wherein the bun platform is pivotable at least 180 degrees from the food steaming position.

3. The device of claim 1 wherein the food steaming position is approximately 135 degrees offset from the food removal position about the hinge axis.

4. The device of claim 1 wherein the bun platform comprises a pair of steaming domes disposed over the bun platform openings to direct steam through the bun platform and, when bun sections are placed on the steaming domes, onto the bun sections.

5. The device of claim 1 wherein the first opening and the second opening are configured so that an open clamshell container may be placed over the first opening and the second opening simultaneously.

6. The device of claim 1 wherein the platform support comprises a plurality of platform mounts for detachably mounting the bun platform to pivot in a plurality of different directions.

7. The device of claim 1 further comprising a cover hinge connecting the cover to the platform support opposite the platform hinge, to permit the cover to pivot open in a direction opposite to the bun dispensing direction, to permit dispensing buns to a dispensed position in a clamshell box on an approximately horizontal, planar working surface at an opposite side of the device from the opened cover.

8. The device of claim 1 further comprising a pivotal cover joint connecting the cover to the platform support, wherein the cover joint is adjacent to the platform joint, and wherein the cover joint is generally parallel to the platform joint to permit pivoting the cover to a dispensing position, in which the cover is disposed to receive and retain a clamshell sandwich box containing steamed bun sections in a dispensed position.

9. A device for steaming a food item comprising:
    a food item platform;
    a platform support;
    a platform hinge connecting the food item platform to the platform support, wherein the food item platform is pivotable about a hinge axis defined by the hinge between a food steaming position and a food removal position; and
    a steam source communicating with a steam outlet, the steam outlet configured to direct steam onto the food item platform when the food item platform is in the food steaming position;
    a cover, wherein the cover cooperatively engages the food item platform defining a cavity, the cavity comprising a seal to substantially retain steam in the cavity when the device is in the food steaming position, the cover having two partitions that divide the cover into a left portion and a right portion of approximately the same size, the two partitions being usable to locate an open container on the cover; and
    a cover hinge connecting the cover to the platform support, wherein the cover hinge is adjacent to the platform hinge, and wherein the cover hinge is generally parallel to the platform hinge.

10. The device of claim 1 wherein the bun platform comprises a food steaming panel comprising a steam permeable material in a form selected from a mesh and a screen.

11. The device of claim 10 wherein the bun steaming panel comprises steaming domes disposed over the bun platform openings to direct steam through the bun platform and, when bun sections are placed on the steaming domes, onto the bun sections.

12. The device of claim 1 further comprising an LED indicator light to provide a visual signal when steaming is completed.

13. The device of claim 1 further comprising an audible signal indicator to provide an audio signal when steaming is completed.

14. A device for steaming a food item comprising:
 a food item platform;
 a platform support comprising a plurality of platform mounts for detachably mounting the food item platform to pivot in a plurality of different directions, wherein two of said plurality of platform mounts are located at opposite sides of the platform support to define opposite pivotal axes, the opposite pivotal axes being generally parallel to each other to define generally opposite pivoting directions of the food item platform away from the platform support;
 a platform hinge connecting the food item platform to the platform support, wherein the food item platform is pivotable about a hinge axis defined by the hinge between a food steaming position and a food removal position;
 a steam source communicating with a steam outlet, the steam outlet configured to direct steam onto the food item platform when the food item platform is in the food steaming position; and
 a cover cooperatively engageable to the food item platform to define a food steaming cavity when the device is in the food steaming position, the cover pivotally connected to the platform support about a pivotal axis that is generally perpendicular to said opposite pivotal axes defined by said two of the platform mounts, to permit the cover to pivot in a direction away from the platform support that is perpendicular to said opposite pivoting directions of the food item platform.

15. The device of claim 1, further comprising
 a base portion disposed below the bun platform in the steaming position and adapted to rest on a generally horizontal, planar working surface to maintain the bun platform parallel to the working surface when the bun platform is in the steaming position, the bun platform being pivotally supported relative to the base portion; and
 a downwardly extending portion adapted to extend below the working surface and to abut a straight edge of the working surface when the base portion rests on the working surface.

16. The device of claim 1, further comprising a bottom surface of a continuously flat peripheral rim of said cover contacting said bun platform at a surface area of contact having a width extending away from said cavity to form a seal for retaining steam in said cavity when the dome engages the bun platform in the food steaming position.

* * * * *